(12) United States Patent
Maxwell et al.

(10) Patent No.: US 11,474,252 B2
(45) Date of Patent: Oct. 18, 2022

(54) TRANSIT LOCATION SYSTEMS AND METHODS USING LIDAR

(71) Applicant: Piper Networks, Inc., San Diego, CA (US)

(72) Inventors: Duane Maxwell, San Diego, CA (US); Robert Hanczor, San Diego, CA (US); Shang Yi Huang, San Diego, CA (US)

(73) Assignee: Piper Networks, Inc., San Diego, CA (US)

( * ) Notice: Subject to any disclaimer, the term of this patent is extended or adjusted under 35 U.S.C. 154(b) by 0 days.

(21) Appl. No.: 17/076,668

(22) Filed: Oct. 21, 2020

(65) Prior Publication Data
US 2021/0149055 A1    May 20, 2021

Related U.S. Application Data

(60) Provisional application No. 62/945,785, filed on Dec. 9, 2019, provisional application No. 62/924,017, filed on Oct. 21, 2019.

(51) Int. Cl.
*G01S 17/894* (2020.01)
*G01S 17/931* (2020.01)
*G01S 17/06* (2006.01)

(52) U.S. Cl.
CPC .......... *G01S 17/894* (2020.01); *G01S 17/06* (2013.01); *G01S 17/931* (2020.01)

(58) Field of Classification Search
CPC ...... G01S 17/894; G01S 17/931; G01S 17/06; G01S 17/89
See application file for complete search history.

(56) References Cited

U.S. PATENT DOCUMENTS

| 8,537,338 | B1 | 9/2013 | Medasani et al. |
| 9,052,721 | B1 | 6/2015 | Dowdall et al. |
| 11,043,026 | B1* | 6/2021 | Fathi ............... G06N 20/00 |
| 2010/0209013 | A1 | 8/2010 | Minear et al. |
| 2014/0111647 | A1 | 4/2014 | Atsmon et al. |
| 2019/0086546 | A1 | 3/2019 | Tsishkou et al. |
| 2020/0401617 | A1* | 12/2020 | Spiegel ............. G06N 3/08 |

(Continued)

OTHER PUBLICATIONS

International Search Report and Written Opinion in PCT/US20/56714, dated Jan. 28, 2021.

(Continued)

*Primary Examiner* — Luke D Ratcliffe (57) ABSTRACT

Transit location systems and methods using LIDAR are provided. In some embodiments, a computer-implemented method comprises receiving a 3D image captured from a vehicle on a pathway; transforming the 3D image into a first 2D image; and determining a location of the vehicle along the pathway, comprising: comparing the first 2D image to a plurality of second 2D images each captured at a respective known location along the pathway, selecting one or more of the second 2D images based on the comparing, and determining the location of the vehicle along the pathway based on the known location where the selected one or more of the second 2D images was captured. The 3D image may be captured by capturing LIDAR data with a LIDAR unit mounted on the vehicle.

18 Claims, 8 Drawing Sheets
(2 of 8 Drawing Sheet(s) Filed in Color)

(56) References Cited

U.S. PATENT DOCUMENTS

2021/0116914 A1* 4/2021 Ren .................... G05D 1/0274

OTHER PUBLICATIONS

Ashraf et al., "An Investigation of Interpolation Techniques to Generate 2D Intensity Image From LIDAR Data," IEEE Access (vol. 5), Apr. 30, 2017. Retrieved on Dec. 8, 2020. Retrieved from <URL: https://ieeexplore.ieee.org/document/7915679> entire document.

Lin et al., "Lidar image vehicle location transform 3d data to 2d data compare for known location," Sensors and Materials, vol. 32, No. 7 (2020) 2365-2374. Retrieved on Dec. 8, 2020. Retrieved from <URL: https://myukk-org.ssl-xserver.jp/SM2017/sm_pdf/SM2265.pdf> entire document.

"Electromagnetic compatibility and Radio spectrum Matters (ERM); Short Range Devices (SRD); UWB location tracking devices in the railroad environment," ETSI Technical Report, ETSI TR 101 538 V1.1.1 (Oct. 2012).

International Preliminary Report on Patentability for PCT Application No. PCT/US2020/056714, dated May 5, 2022, 6 pages.

* cited by examiner

TRANSIT LOCATION SYSTEMS AND METHODS USING LIDAR

CROSS REFERENCE TO RELATED APPLICATIONS

The present application claims priority to U.S. Provisional Patent Application No. 62/924,017, filed Oct. 21, 2019, entitled "LIDAR RTLS PROJECT," and U.S. Provisional Patent Application No. 62/945,785, filed Dec. 9, 2019, entitled "TRANSIT LOCATION SYSTEMS AND METHODS USING LIDAR," the disclosures thereof incorporated by reference herein in their entirety.

BACKGROUND

The present disclosure relates generally to transportation intelligence, and more specifically to systems and methods for identification of transit location.

SUMMARY

Embodiments of the present disclosure provide systems and methods for tracking information relating to transportation vehicles. For example, some embodiments of the disclosure provide a system for enhanced location and data collection from vehicles traveling along a vehicle pathway. For example, the vehicle may be a light rail train, a commuter train, a freight train, an automobile, an airplane, a ship, a space vehicle, a ski lift, a gondola, or other forms of transportation as known in the art. The transportation pathway may be any pathway along which the respective vehicle moves, such as a train track, a road, a canal or shipping lane, a runway, an airway, or other vehicle pathways as known in the art.

The method may include capturing a 3D image from the vehicle on the pathway the vehicle is traveling. The vehicle may employ Light Detection and Ranging (LIDAR) technology to generate the 3D image of the pathway. In one embodiment, a LIDAR unit is mounted on a subway train to capture images of the subway tunnel.

A computer may be used to process the collected LIDAR data to determine the position of the vehicle. The computer may be located on the vehicle. For each 3D image, the computer receives the LIDAR data, and transforms the 3D image into a 2D image. The 2D image may be compared to reference 2D images previously captured at known locations along the pathway. Based on this comparison, the computer may select one or more of the reference 2D images that are most similar to the captured 2D image. The location of the vehicle on the pathway may be determined based on the locations at which the selected reference 2D images were captured.

In some embodiments, the 2D images are color images in a color space. For example, the color space may be the HSV color space. However, other color spaces may be used. In these embodiments, transforming a 3D image into a 2D image may include converting captured data for each point in the 3D image into color data in the color space for a corresponding point in the 2D image. In the case of LIDAR data, the captured data for each point includes a distance value and a reflectivity value, and converting the captured data for a point may include mapping the distance value for the point to a value of a first component of the color space, and mapping the reflectivity value for the point to a value of second component of the color space. In the example of the HSV color space, the distance value may be mapped to the H value, and the reflectivity value may be mapped to the V value.

Some embodiments include eliminating false positive matches between the captured 2D image in the reference 2D images. In these embodiments, one or more of the matching 2D images is deselected as a false positive match prior to determining the location of the vehicle along the pathway.

In some embodiments, comparing the captured 2D image to the reference 2D images employs the use of keypoints and descriptors. In these embodiments, a plurality of keypoints are extracted from each of the captured 2D image and the reference 2D images, and a respective descriptor is generated for each of the 2D images based on the keypoints.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the present disclosure provide systems and methods for locating vehicles along pathways using LIDAR technology. For clarity and conciseness, in the following description, the vehicles and pathways are described as trains and tracks. However, the disclosed technology may be used to locate any vehicle along any pathway. Furthermore, the disclosed technology is not limited to LIDAR, and may be used with any technology that captures 3D data in the form of distance and reflectivity.

According to the disclosed embodiments, a LIDAR unit mounted on the train captures a 3D image, and uses the 3D image to determine a location of the train along its track. In conventional approaches, the captured 3D image is compared to reference 3D images previously captured at known locations along the track. However, the computations required to quickly compare 3D images are so intensive that the power required by the computer performing the comparisons exceeds the power available on a standard subway train. The disclosed embodiments take a different approach.

In the disclosed embodiments, the 3D images are converted to 2D images, and the 2D images are compared. The power required to compare 2D images is well within the capacity of a standard subway train. Accordingly, a computer performing the techniques described herein may be located on the train.

Embodiments of the disclosed technology may feature additional advantages. In particular, the disclosed location systems require no wayside equipment. That is, all of the equipment required to determine the location of the train may be located on or inside the train. As wayside equipment involves significant installation and maintenance costs, this feature greatly reduces the costs of operating a location system.

Figure 1:
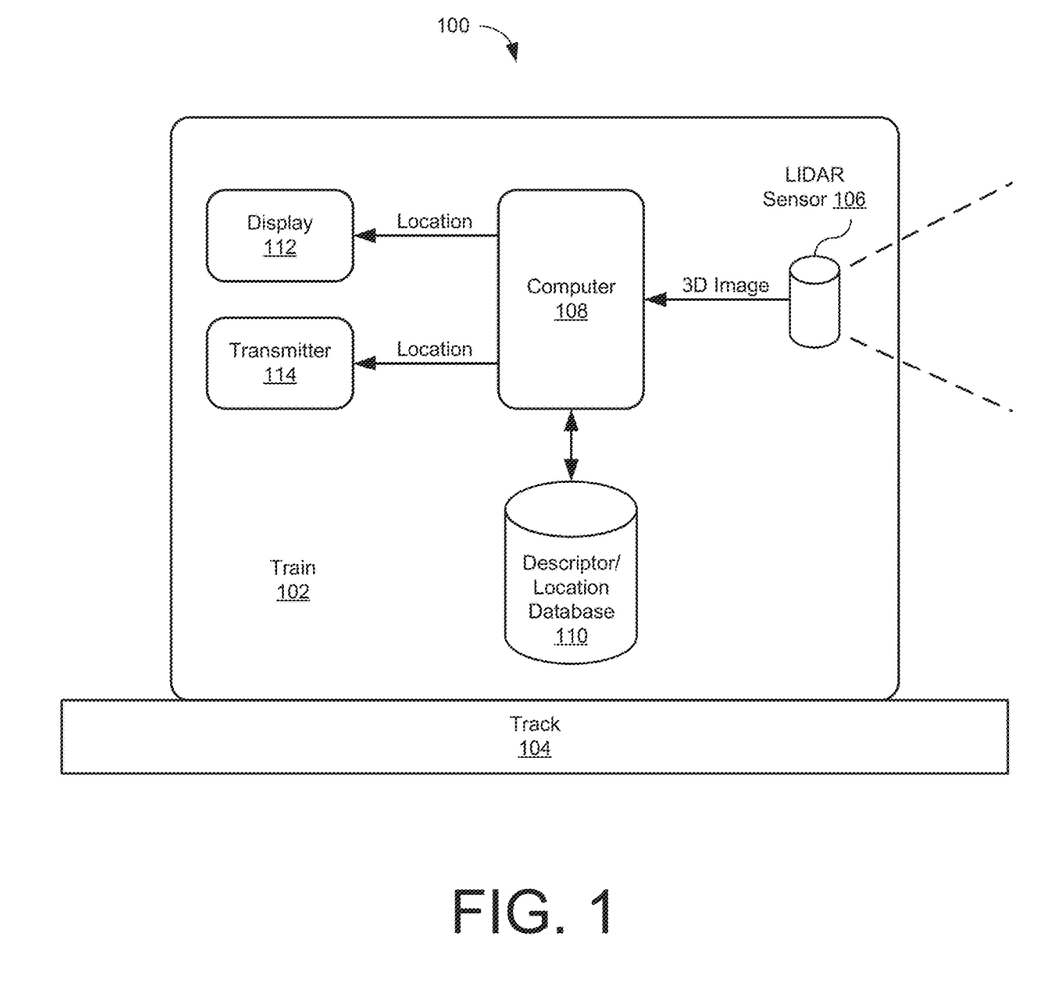
FIG. 1 illustrates a location system for a train on a track according to embodiments of the disclosed technology.

FIG. 1 illustrates a location system 100 for a train 102 on a track 104 according to embodiments of the disclosed technology. But as noted above, this technology may be used to locate other vehicles on other pathways as well.

Referring to FIG. 1, the train 102 may be located on a track 104. The train may be traveling or stationary. For example, the location system 100 may be used to determine the location of a stationary train 102 when the train 102 is first powered up. As another example, the location system 100 may be used to determine the location of the train 102 as it is traveling along the track 104.

The location system 100 may include a LIDAR sensor 106. The LIDAR sensor 106 may be installed at any location on the outside of the train 102, for example at the front or rear of the train 102. The LIDAR sensor 106 may collect 3D images, for example according to conventional techniques. For example, the LIDAR sensor 106 may include a rotating sensor with multiple beams arranged at multiple angles. In other examples, the LIDAR sensor 106 may include a stationary sensor with a rotating mirror to form the multiple beams. However, any LIDAR technology may be used to implement the LIDAR sensor 106.

The location system 100 may include a computer 108. In some embodiments, the computer 108 may be implemented as a special-purpose computer, for example being optimized to perform the calculations described herein, and/or ruggedized to withstand the operating environment of the train 102. In other embodiments, the computer 108 may be implemented as a general-purpose computer.

The location system 100 may include a descriptor/location database 110. The database 110 may include descriptors generated from LIDAR images previously captured along the track 104 at known locations. For example, in a survey mode, the location system 100 may be employed to generate the database 110. In the survey mode, the system 100 may include a position sensor (not shown) to provide a location for each 3D image captured by the LIDAR sensor 106. The system 100 transforms each 3D image to a 2D image, generates a descriptor for the 2D image, and stores the descriptor and location in the database 110. Then, after the database 110 is populated, the location system 100 may be operated in a location mode to determine the location of the train 102 based on the images captured by the LIDAR sensor 106 and the descriptors and locations stored in the database 110, for example as described in detail below.

The locations generated by the location system 100 may be used in any manner. For example, the location system 100 may include an on-board display 112 to display the locations for operators of the train 102. The display 112 may show an interactive map of the track system, along with an indicator of the current position of the train 102. As another example, the location system may include an on-board transmitter 114 to transmit the locations to systems beyond the train 102. For example, the locations could be transmitted to a central control system for use in controlling multiple trains traveling the track 104.

Figure 2:
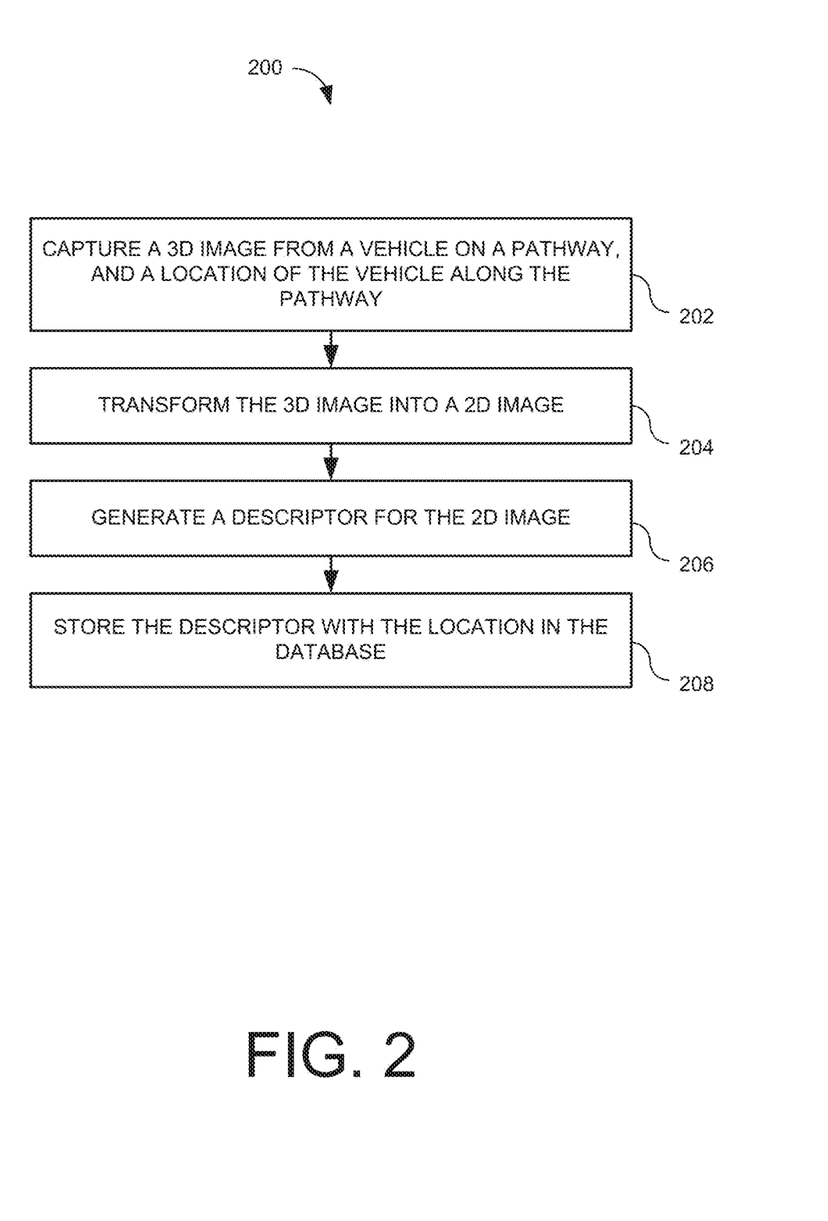
FIG. 2 illustrates a process for surveying a train track according to embodiments of the disclosed technology.

FIG. 2 illustrates a process 200 for surveying a train track 104 according to embodiments of the disclosed technology. While elements of process 200 are described in a particular order, it should be understood that in various embodiments steps may be omitted, performed in other orders, performed concurrently, and the like.

During the survey, the train 102 travels along the track 104. The train may include a LIDAR sensor 106, for example as shown in FIG. 1. As the train 102 travels along the track 104, the LIDAR sensor 106 may collect 3D images and locations, at 202. For example, the train 102 may travel along the track 104 at a constant rate of speed while the LIDAR sensor 106 collects 3D images at regular intervals. The train 102 may include a dedicated positioning system to determine its location along the track 104. Any positioning system may be used for this purpose. The positioning system may determine a location of the train 102 along the track 104 for each 3D image collected.

The computer 108 may transform each 3D image into a 2D image, at 204, for example as described in detail below. The computer 108 may generate a descriptor for each 2D image, at 206, also as described in detail below. The computer 108 may store the descriptors and the locations in the database 110, at 208. For example, the computer 108 may store the descriptors and the locations as a table, where each descriptor is associated with its location. Once the survey is complete, the database 110 may be used to determine locations of the train 102 along the track 104.

Figure 3:
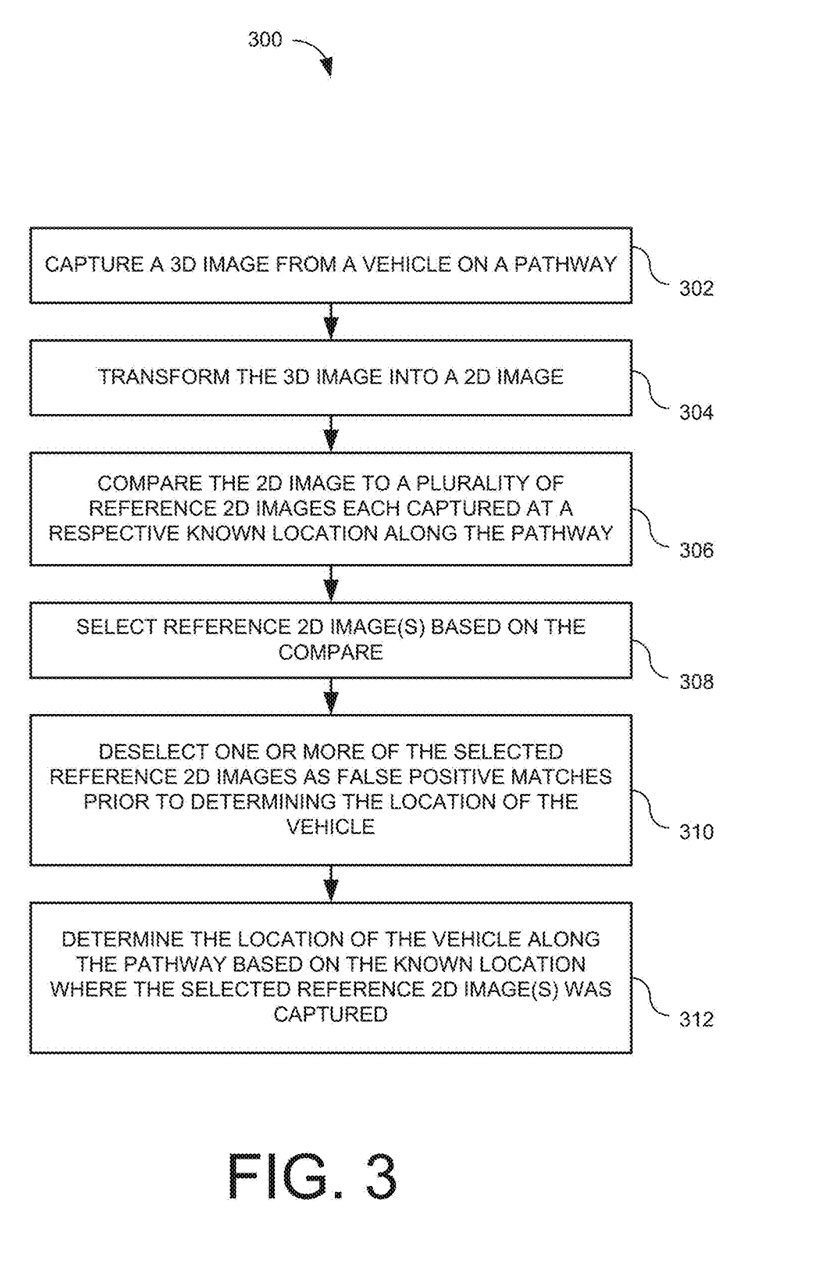
FIG. 3 illustrates a process for determining the location of a vehicle on a pathway according to embodiments of the disclosed technology.

FIG. 3 illustrates a process 300 for determining the location of a vehicle on a pathway according to embodiments of the disclosed technology. While elements of process 300 are described in a particular order, it should be understood that in various embodiments steps may be omitted, performed in other orders, performed concurrently, and the like.

For example, the process 300 may be employed to determine the location of the train 102 traveling along a track 104, as in the example of FIG. 1. This process 300 may employ the database 110 generated according to the example of FIG. 2. Referring to FIG. 3, the process 300 may include capturing a 3D image from a vehicle on a pathway, at 302. In the example of FIG. 1, the LIDAR sensor 106 may capture a 3D image from the train 102. The 3D image may include the track 104, the surroundings of the train 102, and the like. For example, for a surface train 102, the surroundings may include trees, buildings, signs, and the like. For a subway train 102, the surroundings may include tunnel walls, subway infrastructure, subway platforms, and the like.

Figure 4:
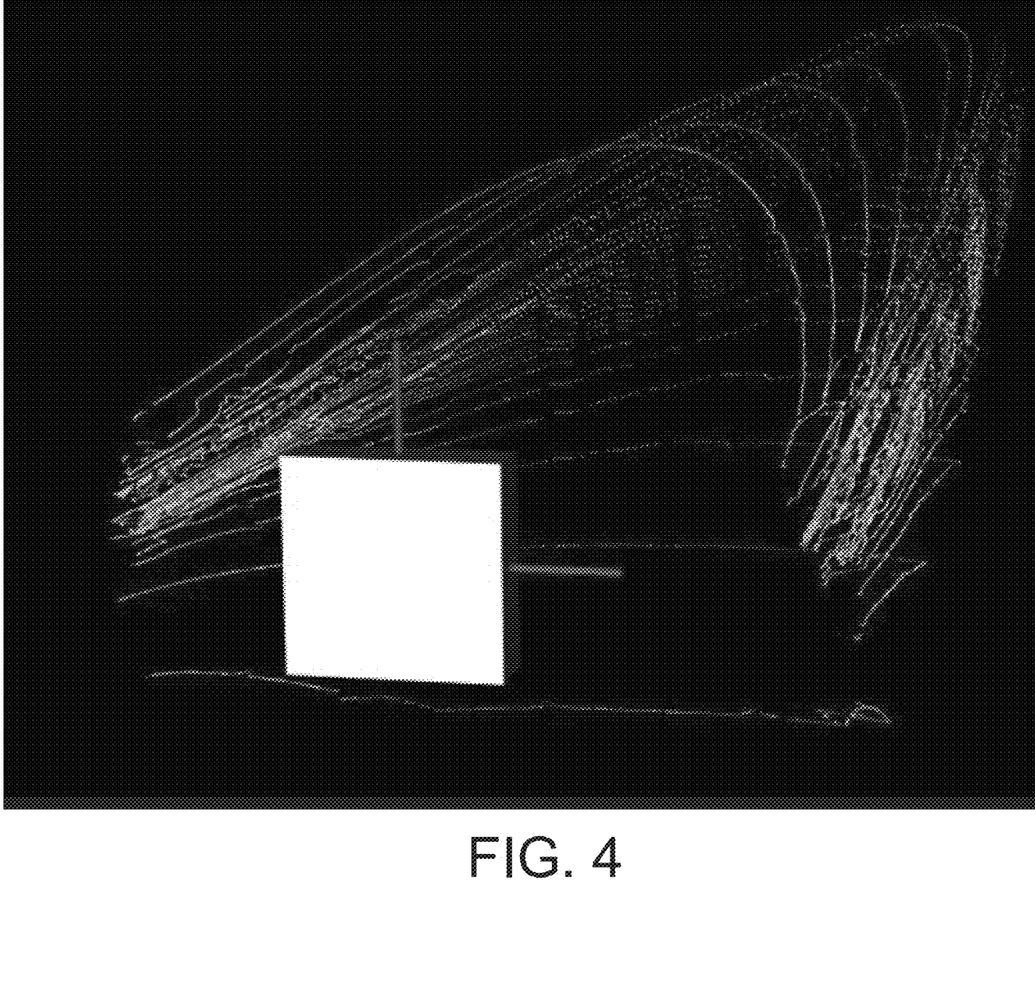
FIG. 4 illustrates a 3D LIDAR image captured by a subway train inside a subway tunnel.

FIG. 4 show a 3D LIDAR image captured by a subway train inside a subway tunnel. In FIG. 4, the white square represents a vertical plane passing through the LIDAR sensor, and parallel to the front of the train. The data collected by reflections of each LIDAR beam can be seen as separate curves in FIG. 4.

Referring again to FIG. 3, the process 300 may include transforming the 3D image into a 2D image, at 304. In some embodiments, the 2D image is a color image in a color space. In other embodiments, other 2D images may be used.

Each point in a 3D LIDAR image may include 4 pieces of data. The data may include the angle θ around the vertical axis of the LIDAR sensor. In some embodiments, the angle θ may be expressed in the range 0 to 360 with 0.2° resolution. The data may include the beam number b. In some embodiments, the LIDAR sensor includes 32 beams, and the beam number b may be expressed as an integer value in the range 0 to 31. The data may include the distance $\delta$ from the unit. In some embodiments, this distance may be expressed as a 16-bit number, in 1 cm increments. A distance of $\delta=0$ may indicate that no reflection of the beam was detected. This may occur when the reflecting surface is beyond the range of the sensor, the reflecting surface fully absorbed the LIDAR beam, the reflecting surface perfectly reflected the LIDAR beam away from the LIDAR sensor, and the like. The data may include the returned signal strength R, also referred to as "reflectivity." The reflectivity R may be expressed as an 8-bit number with arbitrary units.

In some embodiments, each LIDAR image is generated using 2 LIDAR scans. The first scan is used to determine minimum and maximum non-zero distances $\delta_{min}$ and $\delta_{max}$, and minimum and maximum non-zero reflectivities $R_{min}$ and $R_{max}$. On the second scan, each distance and reflectivity is normalized within the minimum and maximum values determined in the first scan, and clamped to the range 0-1 inclusive, for example according to equations (1) and (2).

$$\delta_{norm}=\text{clamp}((\delta-\delta_{min})/(\delta_{max}-\delta_{min}),0,1) \quad (1)$$

$$R_{norm}=\text{clamp}((R-R_{min})/(R_{max}-R_{min}),0,1) \quad (2)$$

This method represents a form of linear dynamic ranging. In some circumstances, it may also be helpful to employ non-linear dynamic ranging as well. For example, this technique may be used to enhance the differential distance in a certain range, exaggerating features that would be helpful for image matching purposes.

Next, the normalized distance and reflectivity may be converted into a color in a color space. For example, one of the most common color spaces is RGB with three 8-bit channels of color, for a range of values of 0-255 per channel. Due to the popularity of this color space, many image processing software libraries exist, notably including many feature extraction algorithms that may be used in embodiments of the disclosed technology. In LIDAR data, distance is arguably more important than reflectivity. But in the RGB color space, distance is mapped to multiple color components. This mapping may represent similar distances as very different colors, resulting in abrupt discontinuities in the resulting image.

Another common color space is HSV. One advantage of using the HSV color space is that distance and reflectivity may be mapped to separate color space components. In some embodiments, the normalized distance and normalized reflectivity may be converted to component values of the HSV color space, for example according to equations (3) through (5).

$$H=360\times\delta_{norm} \quad (3)$$

$$S=1 \quad (4)$$

$$V=R_{norm} \quad (5)$$

In some embodiments, the HSV color space data may be processed directly to obtain keypoints and descriptors. In other embodiments, the HSV color space data may be converted to RGB color space data before this process, for example to take advantage of the existing libraries of algorithms for feature recognition in the RGB color space. In some of these embodiments, low values of V may be enhanced according to equation (6) prior to conversion from the HSV color space to the RGB color space.

$$V=R_{norm}^{0.2} \quad (6)$$

With this technique, very near objects are red in color, with increasing distances shown as orange, then yellow, then green, then blue, the purple, then back to red, proportional to the distance. The brightness of each pixel indicates reflectivity, with brighter pixels indicating higher reflectivity than darker pixels. Abrupt changes in distance appear as abrupt changes in hue, while smooth changes in distance appear as smooth changes in hue. Objects that are substantially less reflective than their nearby surroundings retain their hue but appear darker.

As noted above, for some locations in an image no data may be collected, resulting in undesirable single-pixel "holes." In some embodiments, a filter may be applied to those pixels to "despeckle" the image. For example, a simple median filter may be applied to the pixels.

Figure 5:
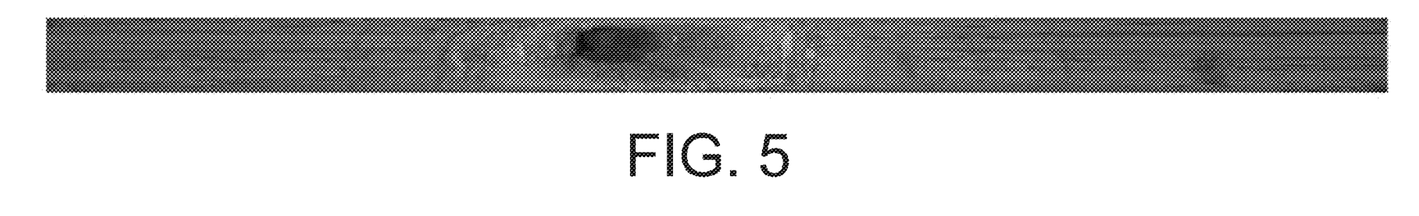
FIG. 5 shows an example 2D image generated according to embodiments of the disclosed technology.

FIG. 5 shows an example 2D image generated according to embodiments of the disclosed technology. The example image is 32 pixels tall, with one scan line for each LIDAR beam. The example image is 595 pixels wide, representing approximately 119 degrees of horizontal range. The image represents a section of subway tunnel that curves to the left. The dark blob near the center of the image shows the tunnel receding into the distance. Yellow blobs near the dark blob represent wayside structures such as signals, cabling, and even debris. On close examination, two subway train tracks can be seen, with the train located on the left track. It can also be seen that the walls of the tunnel are curved, and a raised walkway is present on the right side of the tunnel. This image includes horizontal lines, which are artifacts that could be remedied through better calibration of the LIDAR sensor.

Referring again to FIG. 3, the process 300 may include comparing the 2D image to a plurality of reference 2D images each captured at a respective known location along the pathway, at 306. According to this technique, the location of the reference image(s) that are most similar to the captured image indicate(s) the location of the vehicle along the pathway.

In the disclosed embodiments, instead of comparing the 2D images directly, extracted features of the 2D images are compared. In some embodiments, a plurality of keypoints are extracted from each 2D image. Then a descriptor is generated for each 2D image based on the extracted keypoints. The descriptors may include the keypoints, and may also include additional information about the image surrounding each of the keypoints. For example, the information may describe the gradient of the grayscale values in eight different directions around each keypoint. The captured 2D image may be compared to the reference 2D images by comparing their descriptors.

Several popular algorithms exist for extracting keypoints and descriptors. The open source software package OpenCV includes several such algorithms. Example feature extraction algorithms include the scale-invariant feature transform (SIFT), the speeded up robust features (SURF) algorithm, the oriented fast and rotated brief (ORB) algorithm, and the KAZE, AKAZE, and BRISK algorithms. These algorithms have different behaviors, and focus on different image features. For example, BRISK is a corner detector, while SIFT, SURF, and KAZE are blob detectors. Most of these algorithms have parameters that can be adjusted to "finetune" these behaviors.

These algorithms also have different execution times. Table 1 lists execution times for processing 9021 outdoor images for several of these algorithms, including total execution time and average time per image.

TABLE 1

| Algorithm | Total time (sec) | Average time per image (sec) |
| --- | --- | --- |
| BRISK | 60.64187288284302 | 0.0067223005 |
| SIFT | 54.89843988418579 | 0.00608562685 |
| SURF | 17.822772979736328 | 0.00197569814 |
| KAZE | 140.67809510231018 | 0.01559451226 |

Figure 6:
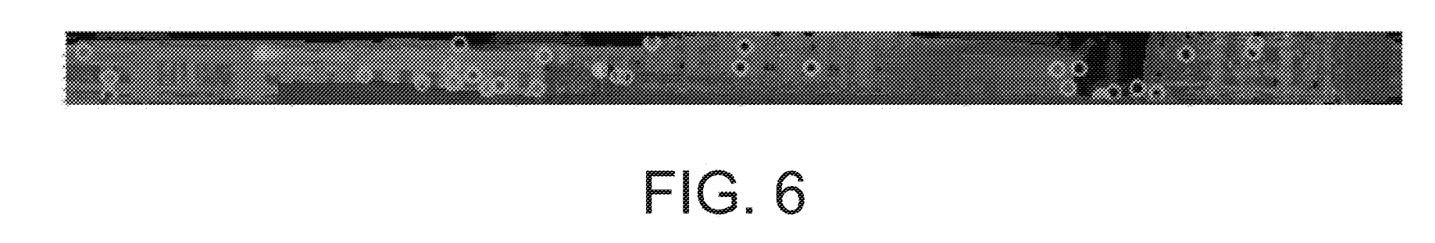
FIG. 6 shows an example outdoor image that has been processed using the SIFT algorithm.

FIG. 6 shows an example outdoor image that has been processed using the SIFT algorithm. In FIG. 6, the bright green circles indicate the keypoints extracted by the SIFT algorithm.

Referring again to FIG. 3, the process 300 may include selecting one or more reference 2D images based on the comparison, at 308. For example, the comparison and matching may be implemented using one or more of the algorithms described above. These algorithms may produce values indicating the quality of the matches.

In some cases, a captured image may match well with multiple preprocessed images. In such cases, the multiple matching images may be used to determine the location of the train. For example, if the top two matches are adjacent in location, with one matching at 75 percent and the other matching at 50 percent, then the location of the train is between the locations of those images, and is likely closer to the location of the former image. Techniques such is weighting functions, interpolation, and the like can be used to determine the location of the train based on these multiple images. As another example, the position of the train may be computed by generating a transformation matrix from the matching keypoints.

Figure 7:
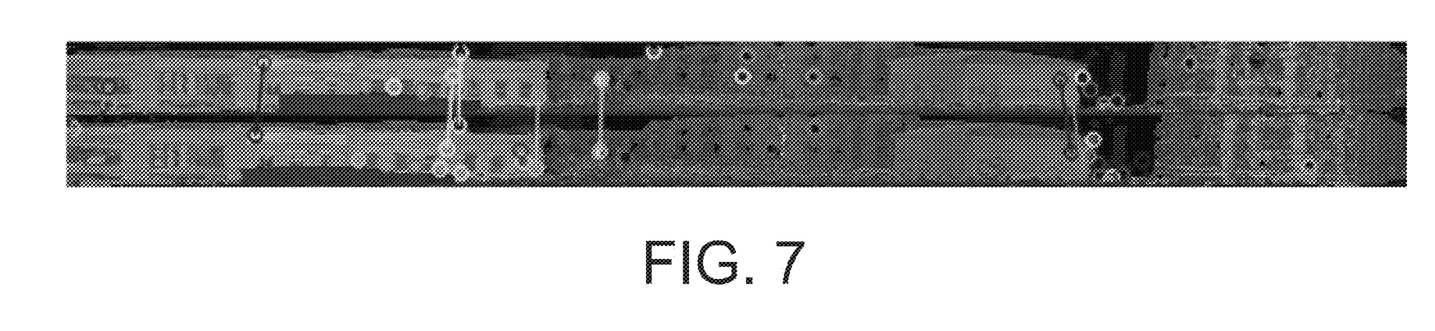
FIG. 7 shows a pair of similar images showing the matching keypoints.

FIG. 7 shows a pair of similar images showing the matching keypoints. Note that one image is shown directly above the other, and that matching keypoints are shown with the same color, and connected with a line of that color. The matches in FIG. 7 were generated using the SIFT algorithm with the brute force K nearest neighbor (BFKNN) matcher.

Figure 8:
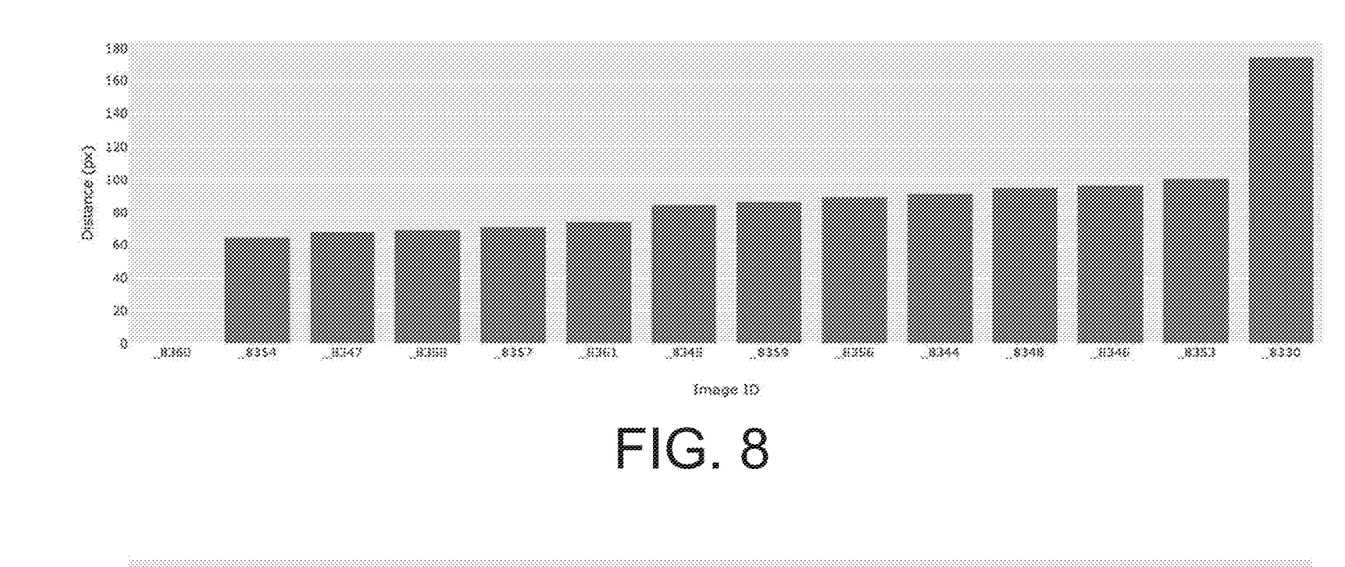
FIG. 8 shows a graph illustrating the quality of matches of several similar images to a captured image.

FIG. 8 shows a graph illustrating the quality of matches of several similar images to a captured image. The quality of each match is indicated by a distance in pixels, with fewer pixels indicating a better match. The captured image has Image ID=8360, and therefore has a distance of zero pixels, as can be seen in FIG. 8. The Image IDs indicate the sequence in which the images were taken. Therefore, the nearest neighbors to the captured image are images 8359 and 8361. From FIG. 8 it can be seen that, while these are good matches, they are not the best matches. In FIG. 8 the best matches are actually false positives.

Referring again to FIG. 3, the process 300 may include deselecting one of the selected reference 2D images as false positive matches prior to determining the location of the vehicle, at 310. Many techniques may be used, alone or in combination, to eliminate false positive matches, as described in detail below. These and other techniques may be used, alone or in combination, to reduce the set of selected reference 2D images.

The process 300 may include determining the location of the vehicle along the pathway based on the known location (s) where the selected reference 2D image(s) was captured, at 312. For example, if only one 2D reference image was selected as matching the captured image, then the location of that 2D image may be used as the location of the vehicle. If multiple reference 2D images were selected as matching the captured image, then the locations of the selected reference 2D images may be used to determine the location of the vehicle, for example using interpolation or other similar techniques, for example as described herein.

Figure 9:
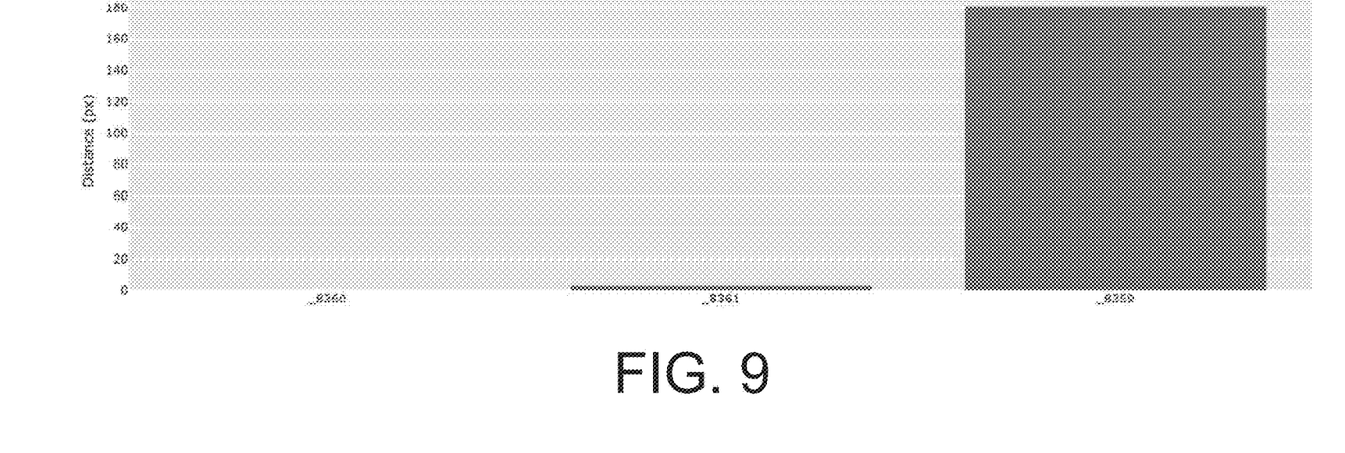
FIG. 9 shows the graph of FIG. 8 after applying a transformation matrix.

One technique for eliminating false positives is to use a transformation matrix, as described in detail below. FIG. 9 shows the graph of FIG. 8 after applying a transformation matrix. As can be seen in FIG. 9, the only matches that remain are the two matches closest to the captured image, namely 8359 and 8361. All of the false positive matches have been eliminated. It can also be seen in FIG. 9 that image 8361 is a much better match than image 8359.

Figure 10:
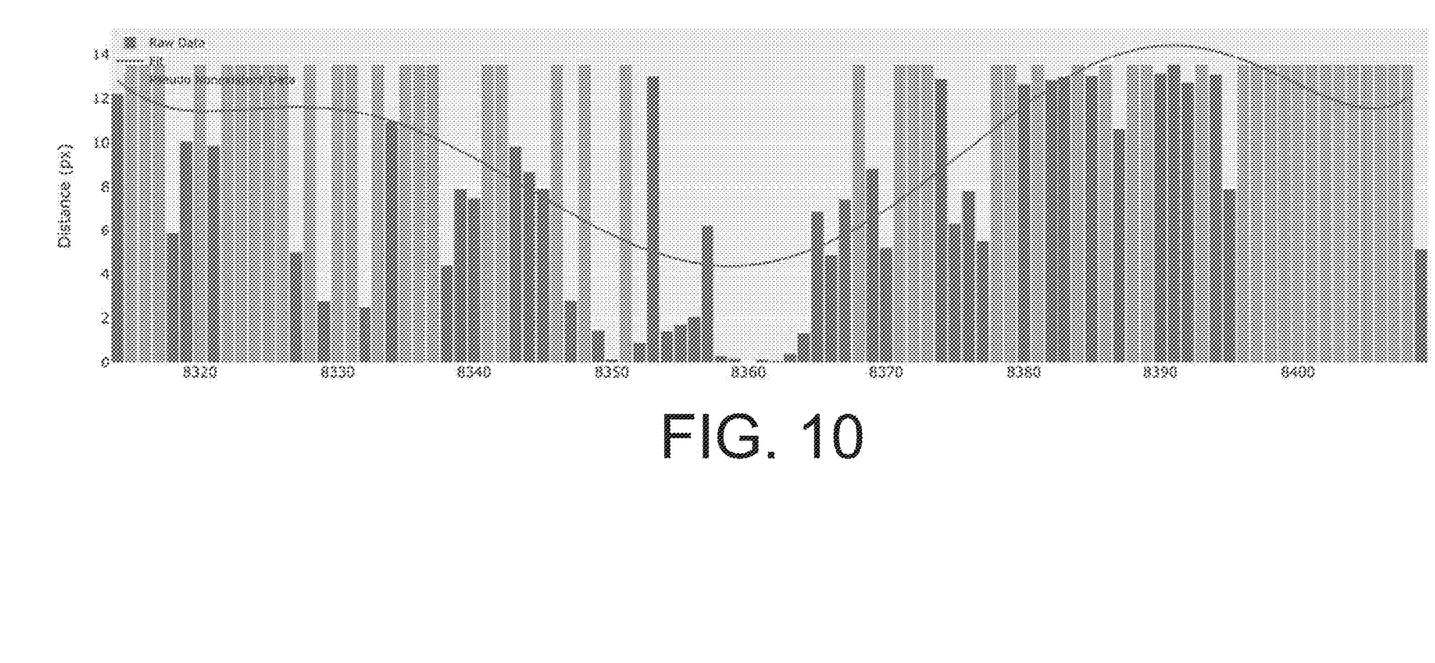
FIG. 10 shows a graph of the matching images of FIG. 8 arranged in sequence.

Another technique for eliminating false positives is to arrange the reference images in sequence, and to find a global minimum of the match indices. FIG. 10 shows a graph of the matching images of FIG. 8 arranged in sequence. In FIG. 10, dark grey bars indicate matching images, and light grey bars indicate no match at all. As can be seen in FIG. 10, a global minimum exists near the captured image 8360. Another minimum exists at 8350, but can be discarded because nearby images match poorly or not at all. Another feature that can be seen in FIG. 10 is that all of the images within four images of the captured image 8360 exhibit some degree of matching. This feature can be employed to eliminate false positives, for example by deselecting images outside a window of ±n matching images at a global minimum.

Another technique for eliminating false positive matches is to simply deselect matches for locations where the train could not possibly be. This technique is aided by the fact that vehicles such as trains have highly constrained behaviors. They are limited in speed and acceleration, cannot spontaneously switch tracks, cannot instantaneously turn around, and so on. These techniques may be used alone or in combination to eliminate many false positive matches.

A mentioned above, false positive matches may be eliminated using transformation matrices. This technique is now described in detail. The points matched between two images can be used to produce a transformation matrix that mathematically encodes the distortion of one image relative to the other. For example, a large picture of a bird could match a similarly sized overall image, but with a smaller image of the bird embedded in it. The transformation matrix produced would reflect the scaling of the bird.

But in the current example, because the captured and reference images are acquired from the same location on the train, and should be very similar for the same location on the track, the transformation matrix should be very close to the identity matrix. In practice it is unlikely that the transformation matrix would be exactly the identity matrix, because the train is unlikely to be in exactly the same location and attitude for both images. That is, the train might be wobbling from side to side, bouncing slightly, and the like.

Open source libraries such as OpenCV provide algorithms for generating these transformation matrices. Quantifying and thresholding of the difference between a transformation matrix and the identity matrix can be used to eliminate erroneous images. One such technique is to take the SSD (Sum of Squared Distance) between a transformation matrix and the identity matrix. Table 2 shows the results of extracting SSDs from a sample of 1000 images for two different types of transformation matrices, namely the homography matrix and the essential matrix.

TABLE 2

| Method | Homography Matrix | Essential Matrix |
| --- | --- | --- |
| Avg. Adj | 1.51 | 1.27 |
| No Match | 17 | 0 |
| Error % | 9.76% | 5.10% |
| Time (sec) | 46.89 | 54.16 | in Table 2, Avg. Adj denotes the average SSD of image IDs from the truth, that is, the correct image. For the homography matrix example, the closest match is on average about 1.51 images away from the truth. For the essential matrix example, the closest match is on average about 1.27 images away from the truth.

No Match is the number of images that received no matches. For the homography matrix example, out of the 1000 sample images, 17 had no closest match. For the essential matrix example, every sample image had a match.

Error Percent is the number of images with closest matches that are outside±2 images away from the truth. For the homography matrix example, out of the 1000 sample images, 9.76% were outside of ±2 images to the truth. For the essential matrix example, 5.10% of the sample images were outside of ±2 images to the truth.

Some of the data in table 2 may be better understood with knowledge of differences between the essential matrix and the homography matrix. The homography matrix requires at least 4 keypoints to compute, and the keypoints must be coplanar to each other. For example, the four points of a postcard exist in the same plane and are coplanar no matter how the paper is positioned. Therefore the homography matrix method can easily identify the postcard in a consecutive array of photos even if the cameras are different for each photo.

The essential matrix is a more generalized form of a homography matrix. Whereas a homography matrix relates coplanar image space points, the essential matrix relates any set of points in an image to points in another image taken by the same camera. To continue the postcard example, the essential matrix method can easily identify which photos are the same (in regards to the position of the postcard and its surroundings) provided that the camera used is the same.

For these reasons, the essential matrix method is better suited for use with the disclosed technology. The results in table 2 confirm this conclusion. While taking 7.27 ms more time per image (because table 2 describes the time to process 1000 images), the essential matrix method has a lower Avg. Adj. number, no missed matches, and a 4.66% lower error percentage.

If the survey images are captured with high enough density, then images near the correct location should closely match the test image, but less so for more distant images. If a strong match with an image is found, but the adjacent images match poorly or not at all, the quality of the match may be suspect. These situations may be resolved using transformations matrices, as described above.

In addition to eliminating false positive matches, it is also desirable to prevent false negative matches. Techniques for preventing false negative matches include collecting alternative images, and removing obsolete images. What an image matches poorly or not at all, there are several possible causes. These may include the presence of another train, temporary construction, new debris, weather conditions, the seasonal appearance of trees, a newly built or now absent building, and the like.

To address these conditions, the described technology may save the image, along with information that may help to determine a location for the image. This information may include a best guess location based on when the system last computed a valid location, when the system next computed a valid location, and timings and speeds between those times and the time at which the image was acquired. Such images can then be processed offline, and added as additional possible candidate images for their locations. If there are multiple images for a location, the system may collect information about which images work best. Should one image perform poorly over a set period of time, it may be eliminated as obsolete. Multiple images may be maintained for one location.

The system may employ several additional techniques, alone or in combination, to improve the results of the system. One such technique employs an additional positioning system, which need only provide coarse, low-quality location information. These approximate locations may be used to eliminate all but a small subset of the reference images for comparison compared with the captured image, thereby greatly improving the performance of the system.

Another technique employs knowledge of the general location of the train to select appropriate algorithms and/or parameters for matching the images. The general location of the train may be determined based on the last known position of the train, by the additional positioning system mentioned above, and the like. For example, some algorithms and/or parameters may work better in tunnels than outdoors. These algorithms and/or parameters may be selected when it is known that the train is in a tunnel. Off-line processing may be used to make these determinations, for example with simulated annealing of parameters to determine the best settings for each area of track for each algorithm.

In some cases, the general location of the train may be unknown, for example when the train is first powered up after a catastrophic power loss. To address these cases, multiple descriptors may be stored for each image, for example including a first descriptor good for providing highly accurate locations, and a second descriptor that does not provide as much accuracy, but that excels at providing general locations. On power up, the system may employ the second descriptor to determine the general location of the train. The system may then use the general location to select algorithms and/or parameters, which may then be used with the first descriptor to obtain an accurate location of the train.

Another technique for preventing false positive matches involves masking portions of the images. In practice, some portions of an image may generate keypoints that are not useful for matching. For example, rail ties may generate many keypoints. But because rail ties appear the same in nearly every image, these keypoints may be useless for image matching. Therefore masking rail ties in the images before generating keypoints may improve the performance of the system.

The locations generated by the disclosed technology have many uses. For example, the locations of the vehicles on pathways may be used for managing the schedules of these vehicles. The locations may be used to warn drivers of conditions on the pathways, or even of the presence of workers on the pathways. Many other applications are contemplated.

Appendix A presents findings from processing a set of images taken inside a tunnel.

Appendix B presents findings from processing a set of images taken outdoors.

As will be appreciated, the methods described herein may be performed using a computing system having machine executable instructions stored on a tangible medium. The instructions are executable to perform each portion of the method, either autonomously, or with the assistance of input from an operator.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

Figure 11:
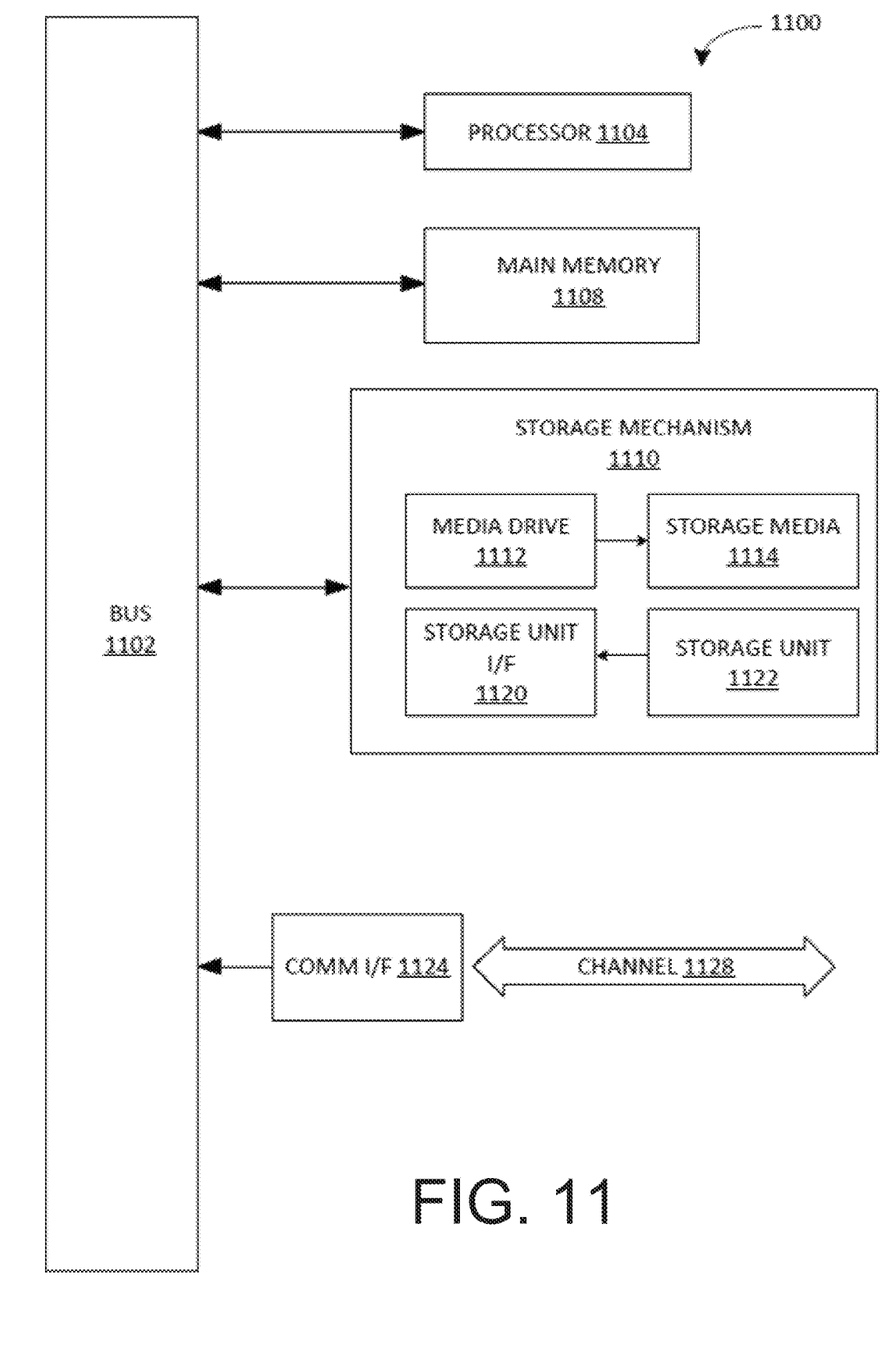
FIG. 11 illustrates an example computing system that may be used in implementing various features of embodiments of the disclosed technology.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. Various embodiments are described in terms of this example logical circuit 1100. After reading this description, it will become apparent to a person skilled in the relevant art how to implement the technology using other logical circuits or architectures.

Referring now to FIG. 11, computing system 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 1100 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control components, or other processing devices, such as a processor 1104. Processor 1104 might be implemented using a general-purpose or special-purpose processing component such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might also include one or more memory components, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to logical circuit 1100.

Logical circuit 1100 might also include a communications interface 1124. Communications interface 1124 might be used to allow software and data to be transferred between logical circuit 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 11 depicts a computer network, it is understood that the disclosure is not limited to operation with a computer network, but rather, the disclosure may be practiced in any suitable electronic device. Accordingly, the computer network depicted in FIG. 11 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of an component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a hardware processor; and
a non-transitory machine-readable storage medium encoded with instructions executable by the hardware processor to perform a method comprising:
receiving a 3D image comprising LIDAR data, the 3D image captured from a vehicle on a pathway;
transforming the 3D image into a first 2D image by converting the LIDAR data for a point in the 3D image into color data in a color space for a corresponding point in the first 2D image, wherein the LIDAR data for the point includes a distance value and a reflectivity value, wherein converting the LIDAR data for the point comprises:
mapping the distance value for the point to a value of a first component of the color space, and
mapping the reflectivity value for the point to a value of a second component of the color space; and
determining a location of the vehicle along the pathway, comprising:
comparing the first 2D image to a plurality of second 2D images each captured at a respective known location along the pathway, wherein each of the second 2D images comprises a plurality of points each having color data in the color space,
selecting one or more of the second 2D images based on the comparing, and
determining the location of the vehicle along the pathway based on the known location where the selected one or more of the second 2D images was captured.

2. The system of claim 1, the method further comprising:
capturing the 3D image.

3. The system of claim 2, wherein capturing the 3D image comprises:
capturing the LIDAR data with a LIDAR unit mounted on the vehicle.

4. The system of claim 1, the method further comprising:
deselecting one or more of the selected second 2D images as false positive matches prior to determining the location of the vehicle.

5. The system of claim 1, wherein comparing the first 2D image to the plurality of second 2D images comprises:
extracting a plurality of keypoints from each of the first and second 2D images;
generating a respective descriptor for each of the first and second 2D images based on the respective keypoints; and
comparing the descriptor of the first 2D image to the descriptors of each of the second 2D images.

6. The system of claim 1, wherein the vehicle on a pathway is a train on a track.

7. A non-transitory machine-readable storage medium encoded with instructions executable by a hardware processor of a computing component, the machine-readable storage medium comprising instructions to cause the hardware processor to perform a method comprising:
receiving a 3D image comprising LIDAR data, the 3D image captured from a vehicle on a pathway;
transforming the 3D image into a first 2D image by converting the LIDAR data for a point in the 3D image into color data in a color space for a corresponding point in the first 2D image, wherein the LIDAR data for the point includes a distance value and a reflectivity value, wherein converting the LIDAR data for the point comprises:
mapping the distance value for the point to a value of a first component of the color space, and
mapping the reflectivity value for the point to a value of a second component of the color space; and
determining a location of the vehicle along the pathway, comprising:
comparing the first 2D image to a plurality of second 2D images each captured at a respective known location along the pathway, wherein each of the second 2D images comprises a plurality of points each having color data in the color space,
selecting one or more of the second 2D images based on the comparing, and
determining the location of the vehicle along the pathway based on the known location where the selected one or more of the second 2D images was captured.

8. The non-transitory machine-readable storage medium of claim 7, the method further comprising:
capturing the 3D image.

9. The non-transitory machine-readable storage medium of claim 8, wherein capturing the 3D image comprises:
capturing the LIDAR data with a LIDAR unit mounted on the vehicle.

10. The non-transitory machine-readable storage medium of claim 7, the method further comprising:
deselecting one or more of the selected second 2D images as false positive matches prior to determining the location of the vehicle.

11. The non-transitory machine-readable storage medium of claim 7, wherein comparing the first 2D image to the plurality of second 2D images comprises:
extracting a plurality of keypoints from each of the first and second 2D images;
generating a respective descriptor for each of the first and second 2D images based on the respective keypoints; and
comparing the descriptor of the first 2D image to the descriptors of each of the second 2D images.

12. The non-transitory machine-readable storage medium of claim 7, wherein the vehicle on a pathway is a train on a track.

13. A computer-implemented method comprising:
receiving a 3D image comprising LIDAR data, the 3D image captured from a vehicle on a pathway;
transforming the 3D image into a first 2D image by converting the LIDAR data for a point in the 3D image into color data in a color space for a corresponding point in the first 2D image, wherein the LIDAR data for the point includes a distance value and a reflectivity value, wherein converting the LIDAR data for the point comprises:
mapping the distance value for the point to a value of a first component of the color space, and
mapping the reflectivity value for the point to a value of a second component of the color space; and
determining a location of the vehicle along the pathway, comprising:
comparing the first 2D image to a plurality of second 2D images each captured at a respective known location along the pathway, wherein each of the second 2D images comprises a plurality of points each having color data in the color space,
selecting one or more of the second 2D images based on the comparing, and determining the location of the vehicle along the pathway based on the known location where the selected one or more of the second 2D images was captured.

14. The computer-implemented method of claim 13, further comprising:
capturing the 3D image.

15. The computer-implemented method of claim 14, wherein capturing the 3D image comprises:
capturing the LIDAR data with a LIDAR unit mounted on the vehicle.

16. The computer-implemented method of claim 13, further comprising:
deselecting one or more of the selected second 2D images as false positive matches prior to determining the location of the vehicle.

17. The computer-implemented method of claim 13, wherein comparing the first 2D image to the plurality of second 2D images comprises:
extracting a plurality of keypoints from each of the first and second 2D images;
generating a respective descriptor for each of the first and second 2D images based on the respective keypoints; and
comparing the descriptor of the first 2D image to the descriptors of each of the second 2D images.

18. The computer-implemented method of claim 13, wherein the vehicle on a pathway is a train on a track.

* * * * *